No. 725,469. PATENTED APR. 14, 1903.
J. H. MINER.
SAW.
APPLICATION FILED JULY 23, 1902.
NO MODEL.

Attest:
C. S. Middleton
Edward Barton

Inventor
James H. Miner,
by
Atty.

UNITED STATES PATENT OFFICE.

JAMES H. MINER, OF LUMBERTON, MISSISSIPPI, ASSIGNOR TO IDA M. MINER.

SAW.

SPECIFICATION forming part of Letters Patent No. 725,469, dated April 14, 1903.

Application filed July 23, 1902. Serial No. 116,735. (No model.)

*To all whom it may concern:*

Be it known that I, JAMES H. MINER, a citizen of the United States, residing at Lumberton, Mississippi, have invented certain new and useful Improvements in Saws, of which the following is a specification.

My invention relates to improvements in saws, and more particularly to the manner of securing removable teeth in or to the saw-body.

The invention is illustrated in the accompanying drawings, in which—

Figure 1:
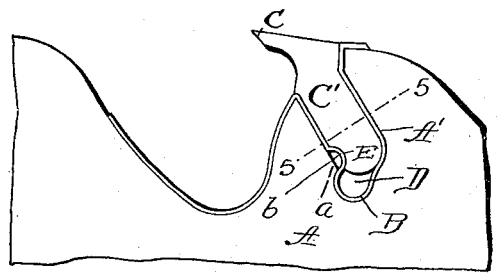
Figure 2:
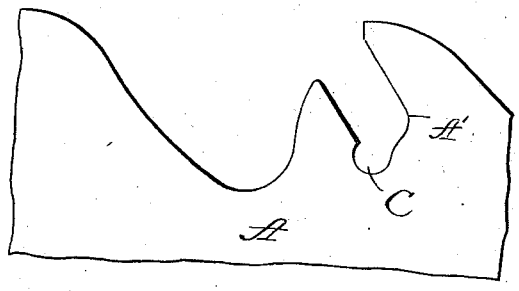
Figure 3:
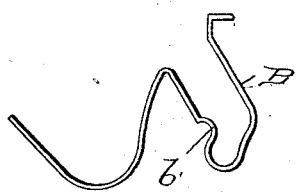
Figure 4:
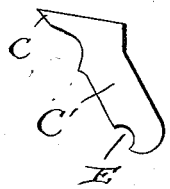
Figure 5:

Figure 1 is a side elevation of a portion of a saw, showing one of the teeth in place. Fig. 2 is a similar view of the saw with the tooth and spring removed. Fig. 3 is a detail of the lining-spring. Fig. 4 is a view of the tooth. Fig. 5 is a section on line 5 5 of Fig. 1.

In the drawings, A designates the body of the saw, having a plurality of tooth-holding recesses A', only one of which, however, is shown. This recess is preferably of the shape shown, having side edges which are for the most part parallel, the lower, however, being provided with a recess C. B represents a holding-spring which is shaped to conform to the recess of the saw and to a portion of the edge on each side thereof. The spring, however, does not throughout its whole extent conform to the edge of the slot, as it is provided with an inward bend *b* opposite the straight portion *a* of the wall of the recess or slot.

The tooth is shown at C', having a suitable cutting edge *c*, parallel side walls, and a notch or recess E, which is designed to receive the inward bend *b* of the spring.

It will be understood, of course, that the meeting edges of the saw-body and spring and the spring and tooth are dovetailed into each other, as shown in Fig. 5.

In assembling the parts the spring is forced into the recess or socket until the bend springs into the recess C, when the spring will be securely held in position. The tooth is then forced in until the bend *b* thereof springs into the notch E, when the tooth will be securely held.

In removing the tooth a pointed instrument may be inserted at point D and the tooth readily pried out.

Having thus described my invention, what I claim is—

1. In combination, a saw-body having a socket, a tooth held therein, and a steel lining between the tooth and saw-body, substantially as described.

2. In combination, a saw-body having a tooth-socket, a lining-spring fitting the same and having a projecting bend engaging a corresponding recess in the body, a tooth held by said lining, said spring having a bend projecting into a recess in the tooth, substantially as described.

3. In combination, a saw having a tooth-socket and a throat adjacent thereto, a steel spring lining said socket and extending over and covering the edge of the throat and a tooth held within the socket by said spring, substantially as described.

In testimony whereof I affix my signature in presence of two witnesses.

JAMES H. MINER.

Witnesses:
H. H. CHAMBLISS,
H. C. YAWN.